US012742677B2

(12) United States Patent
Shalaev et al.

(10) Patent No.: US 12,742,677 B2
(45) Date of Patent: Sep. 22, 2026

(54) ALL-OPTICAL EPSILON-NEAR-ZERO ENABLED STREAK CAMERA

(71) Applicant: Purdue Research Foundation, West Lafayette, IN (US)

(72) Inventors: Vladimir M. Shalaev, West Lafayette, IN (US); Alexandra Boltasseva, West Lafayette, IN (US); Colton B. Fruhling, Lafayette, IN (US); Mustafa Goksu Ozlu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 318 days.

(21) Appl. No.: 18/651,161

(22) Filed: Apr. 30, 2024

(65) Prior Publication Data

US 2024/0369404 A1 Nov. 7, 2024

Related U.S. Application Data

(60) Provisional application No. 63/463,530, filed on May 2, 2023.

(51) Int. Cl.
*G01J 1/04* (2006.01)
*G01J 1/44* (2006.01)
(Continued)

(52) U.S. Cl.
CPC ............... *G01J 1/0407* (2013.01); *G01J 1/44* (2013.01); *H04N 25/71* (2023.01); *H04N 25/76* (2023.01);
(Continued)

(58) Field of Classification Search
CPC .... G01J 1/0407; G01J 1/44; G01J 2001/4473; G01J 2001/448; H04N 25/71; H04N 25/76
(Continued)

(56) References Cited

U.S. PATENT DOCUMENTS 11,698,460 B2 * 7/2023 Shaltout ............... G02B 5/1828 356/4.01
2017/0085211 A1 * 3/2017 Molesky ................. H02S 10/30
2020/0098817 A1 3/2020 Opachich et al.

OTHER PUBLICATIONS

Vasudev, et al."Electro-optical modulation of a silicon waveguide with an "epsilon-near-zero" material," Optics Express 21. 22 (2013) (Year: 2013).*

(Continued)

*Primary Examiner* — Michael Maskell
(74) *Attorney, Agent, or Firm* — Piroozi-IP, LLC

(57) ABSTRACT

A streak camera is disclosed which includes an entrance slit forming a first end of the streak camera, the entrance slit having a width and height, an image capture device forming a second send of the streak camera, and an epsilon-near-zero (ENZ) slab defined by a bandgap energy and plasma frequency disposed within the streak camera, the ENZ slab configured to receive two beams with a predetermined delay therebetween, the two beams include i) a witness beam through the entrance slit at an incident angle θ, and ii) a trigger beam at substantially a normal incident angle, wherein the trigger beam applies energy at a level below the bandgap energy of the ENZ slab to thereby modify refractive index of the ENZ slab, and thus generate a modified witness beam at a time-varying exit angle φ(t) onto the image capture device.

25 Claims, 12 Drawing Sheets

(51) Int. Cl.
*H04N 25/71* (2023.01)
*H04N 25/76* (2023.01)

(52) U.S. Cl.
CPC . *G01J 2001/4473* (2013.01); *G01J 2001/448* (2013.01)

(58) Field of Classification Search
USPC ........................................... 250/492.1–492.3
See application file for complete search history.

(56) References Cited

OTHER PUBLICATIONS

Morgenthaler, "Velocity modulation of electromagnetic waves", In: IRE Transactions on Antennas and Propagation 6.2 (1958).
Pacheco-Pen~A et al., "Temporal aiming", In: Light: Science & Applications 9.1 (2020).
Pacheco-Pen~a et al., "Temporal equivalent of the Brewster angle", In: Physical Review B 104.21 (2021).
Reshef et al., "Nonlinear optical effects in epsilon-near-zero media", In: Nature Reviews Materials 4.8 (2019).
Shaltout et al., "Time-varying metasurfaces and Lorentz non-reciprocity", In: Optical Materials Express 5 (2015).
Shaltout et al., "Doppler-shift emulation using highly time-refracting TCO layer", In: Conference on Lasers and Electro-Optics. 2016.
Shaltout et al., "Spatiotemporal light control with frequency-gradient metasurfaces", In: Science 365.6451 (2019).
Vasudev et al., "Electro-optical modulation of a silicon waveguide with an epsilon-near-zero material", In: Optics Express 21.22 (2013).
Zhang et al., "Time-domain Fabry-Perot resonators formed inside a dispersive medium", In: Journal of the Optical Society of America B 38.8 (2021).
Zurita-S'anchez et al., "Reflection and transmission of a wave incident on a slab with a time-periodic dielectric function", In: Physical Review A 79 (2009).
Bar-Hillel et al., "Time refraction and time reflection above critical angle for total internal reflection", In: Physical Review Letters 132.26 (2022).
Boltasseva et al., "Photonic time crystals: from fundamental insights to novel applications", In: Optical Materials Express 14 (2024).
Clerici et al., "Controlling hybrid nonlinearities in transparent con-ducting oxides via two-colour excitation", In: Nature Communications 8 (2017).
Dikopoltsev et al., "Light emission by free electrons in photonic time-crystals", In: Proceedings of the National Academy of Sciences USA 119 (2022).
Fan et al., "Ultrafast wavefront shap-ing via space-time refraction", In: ACS Photonics 10.8 (2023).
Felsen et al., "Wave propagation in time-varying media", In: IEEE Transactions on Antennas and Propagation 18.2 (1970).
Galiffi et al., "Photonics of time-varying media", In: Advanced Photonics 4.1 (2022).
Godin et al., "Fermat's principle for dispersive waves in nonstationary media", In: Days on Diffraction. 2005.
Guo et al., "Nonreciprocal metasurface with space-time phase modu-lation", In: Light: Science & Applications 8 (2019).
Jaffray, "Near-zero-index ultra-fast pulse characterization", In: Nature Communications 13 (2022).
Jaffray, "Nonlinear loss engineering in near-zero-index bulk materials", In: Advanced Optical Materials 12 (2024).
Karimi et al., "Time-varying gradient meta-surface with applications in all-optical beam steering", In: Nanophotonics 12.9 (2023).
Khurgin et al., "Adiabatic frequency shifting in epsilon-near-zero materials: the role of group velocity", In: Optica 7.3 (2020).
Khurgin et al., "Fast and slow nonlinearities in epsilon-near-zero materials", In: Laser & Photonics Reviews 15 (2021).
Kinsey et al., "Near-zero-index materials for photonics", In: Nature Reviews Materials 4.12 (2019).
Liu et al., "Photon acceleration using a time-varying epsilon-near-zero metasurface", In: ACS Photonics 8.3 (2021).
Lustig et al., "Time-refraction optics with single cycle modulation", In: Nanophotonics 12.12 (2023).
Mendonca et al., "Temporal beam splitter and temporal interference", In: Physical Review A 68.4 (2003).
Mendonca et al., "Time refraction and time reflection: two basic concepts", In: Physica Scripta 65.2 (2002).

* cited by examiner

ALL-OPTICAL EPSILON-NEAR-ZERO ENABLED STREAK CAMERA

CROSS-REFERENCE TO RELATED APPLICATIONS

The present non-provisional patent application is related to and claims the priority benefit of U.S. Provisional Patent Application Ser. 63/463,530, filed May 2, 2023, the contents of which are hereby incorporated by reference in its entirety into the present disclosure.

STATEMENT REGARDING GOVERNMENT FUNDING

This invention was made with government support under FA9550-21-1-0299 awarded by the Air Force Office of Scientific Research and under DE-SC0017717 awarded by the Department of Energy. The government has certain rights in the invention.

TECHNICAL FIELD

The present disclosure is generally related to time variant refraction, and in particular to a streak camera utilizing an epsilon-near-zero (ENZ) element.

BACKGROUND

This section introduces aspects that may help facilitate a better understanding of the disclosure. Accordingly, these statements are to be read in this light and are not to be understood as admissions about what is or is not prior art.

Time-variant media in which material properties are not stationary in time, is a relatively new field in optical sciences that is gathering some interest as of late. Of particular interest, is exploration of time-reflection, time-refraction, and temporal steering to the temporal equivalent of the Brewster angle, temporal beamsplitters and light amplification based of photonic time crystals.

EPSILON-NEAR-ZERO (ENZ) materials host a region of wavelengths where the permittivity ε (permittivity describes the propagation of light in a medium) goes to zero resulting in extreme optical phenomenon such as enhanced nonlinearities and diverging phase velocities. Recently, these materials have also been shown to exhibit substantial modulations of optical properties under optical and electric excitation. Furthermore, these modulations can have ultra-fast rise times on the order of 10 s of femtoseconds making them the ideal platform to study time-refraction and time-reflection.

Additionally, and more related to the present disclosure, streak cameras have been utilized for a long time to assist physicists and the like to investigate system dynamics, and particularly very fast dynamics, i.e., less than 10 nanoseconds, produced by lasers and the like. Streak cameras have been available for a long time, with one of the early such references dating back to early 1970s (see e.g., U.S. Pat. No. 3,586,260 to Looney et al., published Jun. 22, 1971). However, the modern streak cameras are much more sophisticated. A conventional streak camera system includes a streak tube having a photocathode with a slit formed thereon, on which a lens projects an image of an incident radiation pulse. The photocathode converts a portion of the incident radiation (photons) into electrons which are accelerated by a high voltage electrostatic field to form a beam of electrons. This beam is passed through a deflection field which is synchronized with the incident radiation pulse to rapidly sweep the electric field between the plates inducing a time-dependent directional change in the electron beam. For example, if the field is swept from low-to-high, electrons passing through the plates at the beginning of the electric field sweep are deflected less than those arriving at the plates later. This sweeping effect in turn affects the intensity of the electron beam prior to impacting a screen (e.g., a phosphor screen) to thereby generate an image which can be captured by a camera for later analysis.

Referring to U.S. Pat. Pub. 20200098817 for Opachich et al., FIG. 1 illustrates a generalized diagram of a prior art streak camera. The '817 publication provides: As shown an energy source directs energy 108 to a slit 112. The energy 108 may be photons. In some embodiments the camera may be angled such that the photons strike an inner wall or block. The slit plate 112 allows only a select portion of the photons to pass and may be aligned with an active region of a photocathode 113, located directly behind the slit plate and also aligned with other components of the streak camera. Exiting the slit plate 112 are electrons 114 which are created by incident radiation upon the photocathode 113. The photocathode 113 emits electrons 114 that pass between two charged plates 116 and through a focusing lens 120 (either magnetic or electro static), which focuses, directs or sweeps the electrons toward and across imaging detector 124, such as a phosphor plate causing the imaging detector to illuminate. This illumination can be viewed and recorded with traditional optical recording devices.

Since in general streak cameras are used for fast-changing optical events, increasing time-sensitivity is of paramount importance. However, even with traditional streak cameras, there are many costly and sensitive elements which makes their deployment challenging, particularly when seeking to capture ever-faster optical events. In particular, in a traditional streak camera, since photons are converted to electrons with the use of a photocathode (see photocathode 113 in FIG. 1) electronic components needed in a traditional streak camera, can become a bottleneck for higher speed streak cameras.

Therefore, there is an unmet need for a novel approach in streak cameras with high levels of time sensitivity in the range of femtoseconds.

SUMMARY

A method of making a photonic time-varying medium is disclosed. The method includes depositing an epsilon-near-zero (ENZ) target material in a deposition chamber having a pressure, thereby causing ablation followed by accumulation in form of a film directly or indirectly onto a substrate until a predetermined thickness of the ENZ target material accumulates on the substrate. The thickness ranges from about 10 nanometer to about 50 μm, wherein the pressure of the deposition chambers is between about $1\times10^{-12}$ to about $1\times10^{-2}$ torr, and wherein the ablation occurs at a temperature of between about −20° C. and about 900° C. within the deposition chamber.

A streak camera is also disclosed. The streak camera includes an entrance slit forming a first end of the streak camera, the entrance slit having a width and height. The streak camera also includes an image capture device forming a second end of the streak camera. Additionally, the streak camera includes an epsilon-near-zero (ENZ) slab defined by a bandgap energy and plasma frequency disposed within the streak camera. The ENZ slab is configured to receive two beams with a predetermined delay therebetween. The two beams include i) a witness beam through the entrance slit at an incident angle θ, and ii) a trigger beam at substantially a normal incident angle. The trigger beam applies energy at a level below the bandgap energy of the ENZ slab to thereby modify refractive index of the ENZ slab, and thus modify the witness beam resulting in a time-varying exit angle φ(t) onto the image capture device.

DETAILED DESCRIPTION

Figure 1:
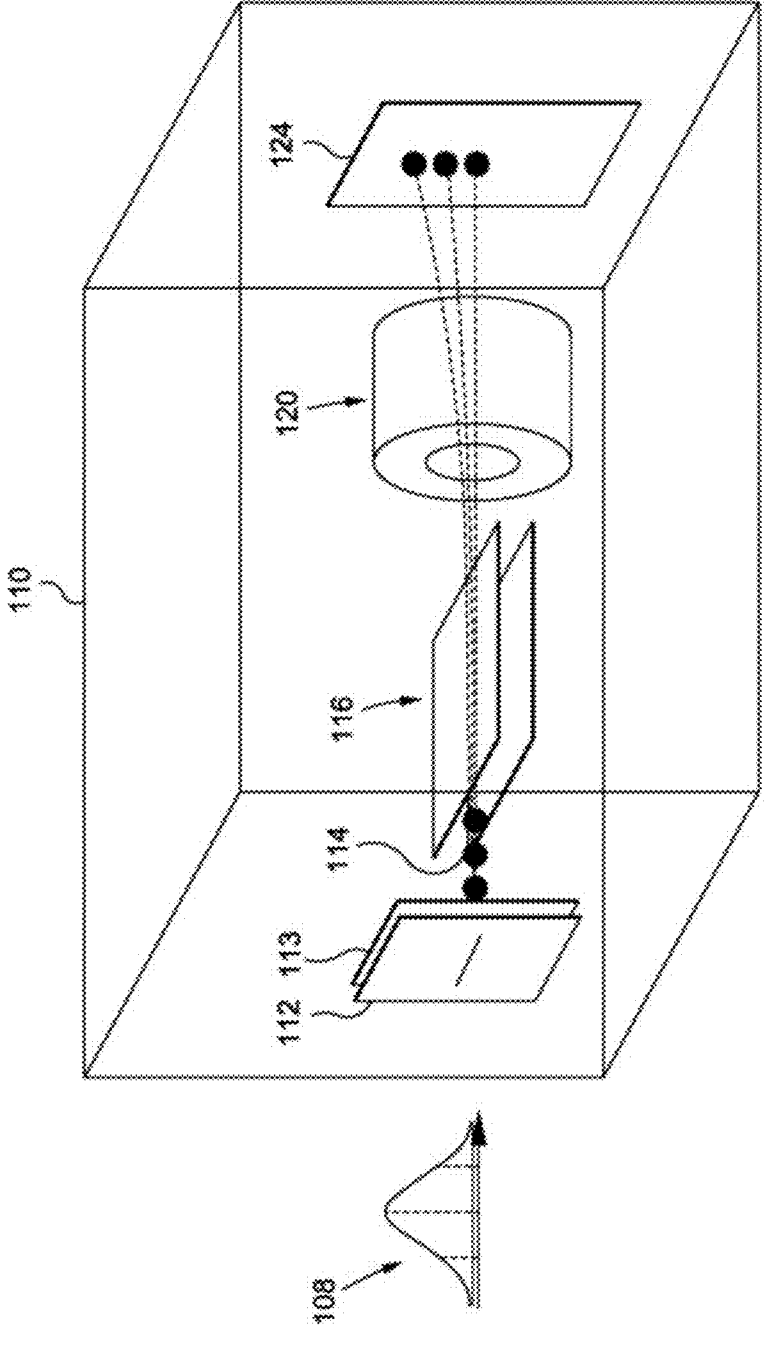
FIG. 1 is a schematic of a prior art streak camera, depicting various components therein including a photocathode for conversion of photons to electrons.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 2:
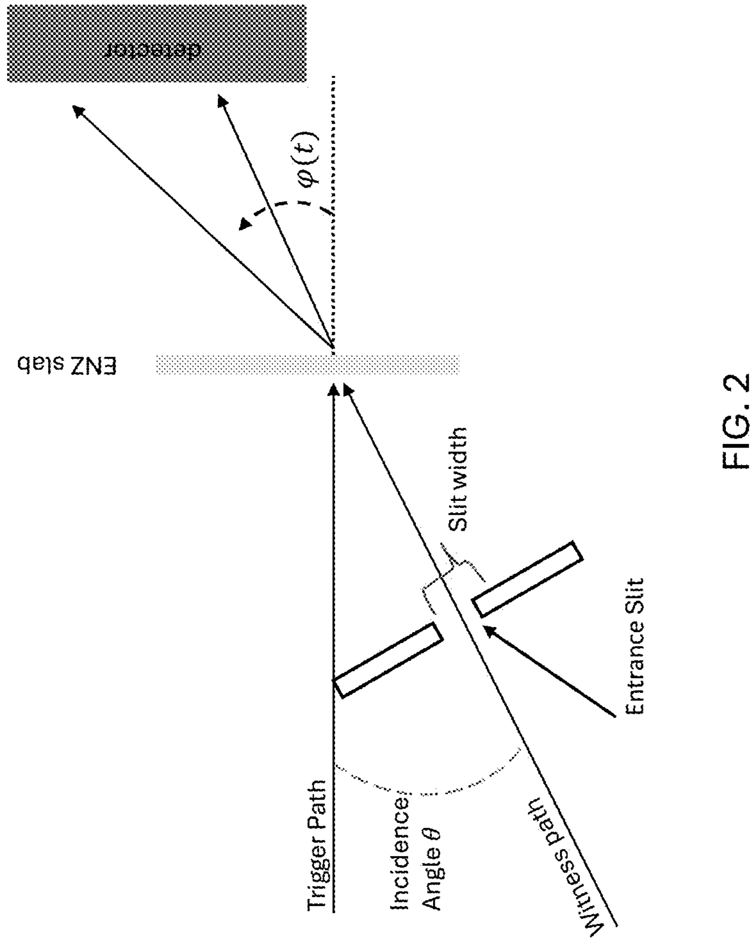
FIG. 2 is a schematic of an all-optical streak camera, according to the present disclosure utilizing only optical elements including an epsilon-near-zero (ENZ) slab to generate time-variant optical properties.

A novel approach in streak cameras is disclosed herein with high levels of time sensitivity in the range of femtoseconds. Referring to FIG. 2, a schematic of a novel streak camera is provided, according to the present disclosure. The streak camera shown in FIG. 2, includes a source of an optical beam, referred to herein as the trigger beam. The streak camera shown in FIG. 2 also includes a source of an optical beam to be analyzed, hereinafter referred to as the witness beam. The witness beam enters the streak camera through an entrance slit formed on a plate. The streak camera shown in FIG. 2 also includes an epsilon-near-zero (ENZ) slab defined by a bandgap energy and plasma frequency, which is disposed in the path of both the witness beam and the trigger beam. The witness beam once passed through the entrance slit is incident on the ENZ slab at an incident angle θ, while the trigger beam is incident on the ENZ slab at substantially a normal incident angle. As indicated above, the incident witness beam arrives at the ENZ slab at an incident angle of θ, while the outgoing witness beam from the ENZ slab is at an output angle of φ(t) which is a time-varying output angle. Additionally, the streak camera of the present disclosure shown in FIG. 2 includes an image capture device denoted as the detector, e.g., a camera, which is adapted to capture the outgoing witness beam out of the ENZ slab in the form of an image.

Figures 3A, 3B:
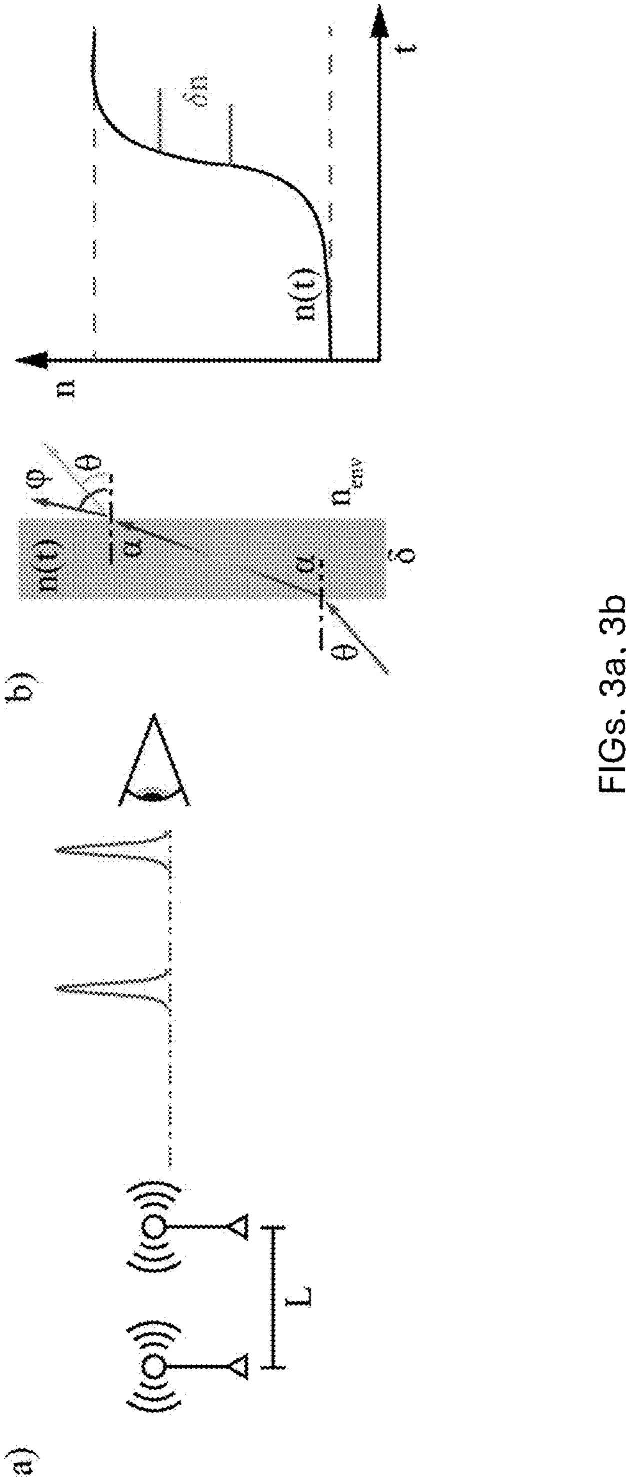
FIG. 3*a* is a schematic of classical physics experiment in which the refraction can change from one instance to another between two transmitters separated by distance L and an observer.
FIG. 3*b* is a schematic and a corresponding graph showing changes in the exit angle φ(t) as function of time based on the time-varying refraction (n(t)).

To study the effect of the ENZ slab providing a medium with a time-varying refraction coefficient, a model was generated. The model is initially based on a classical experiment in optics, depicted in FIGS. 3*a*-3*b* which provide a schematic of said experiment. According to FIG. 3*a*, two antennae are placed a distance L from each other and made to emit a pulsed signal simultaneously. An observer in the same reference frame measures the time delay T between the two pulses. For a time-invariant medium, the result is simply:

$$T = n_0 L / c,$$

where $n_0$ is the refractive index, and c is the speed of light in vacuum. If the refractive index changes precisely at the arrival of the first pulse to a value of $n_1$, the travel time becomes $T=n_1L/c$. Extending further we allow the refractive index to change as the pulse travels a small step Δl and take the limit of infinitely many steps we find distance L expressed as:

$$L = \sum_{v=1}^{N} \Delta l = \sum_{v=1}^{N} \frac{c\Delta t}{n_v} = \int_{t_0}^{t_0+T} \frac{c}{n(t)} dt. \tag{1}$$

From Equation (1) we can see that the time for the two pulses to arrive is related to the distance traveled and the specific function of refractive index. If instead of two pulses, we consider a wave traveling, it is easy to see that although the wavelength does not change, the frequency is modified by the changing medium leading to the more established equation $n_1\omega_1=n_2\omega_2$ found in the literature. Although these two understandings are equivalent in the one-dimensional case, Eqn. (1) can be expanded to more dimensions.

For example, in FIG. 1*b* we depict an optical ray impinging at angle θ onto a time-varying slab of thickness δ with a time dependent refractive index n(t). If we consider a monotonically increasing refractive index increasing from $n_1$ to $n_2$ (right side), the angle of refraction α decreases during the interaction and consequently decreases the distance traveled L as shown in FIG. 1*c*. This distance also depends on the initial angle and the refractive index of the surrounding environment $n_{env}$. The simple $n_1\omega_1=n_2\omega_2$ model does not adequately describe this situation as it only predicts the redshift and not the blueshift.

With the model of the present disclosure, we investigate the exiting angle φ's dependance on the experimental parameters. We start with a simple model which only considers incident and exiting refractive index values. In a homogeneous media the momentum is conserved due to symmetry. A spatial interface breaks this symmetry in one direction but preserves in along the interface. In two dimensions x and y, with the interfaces along constants y=θ and y=δ, the momentum in the x direction is conserved. Therefore, we can write:

$$k_x(y=0^-)=k_x(y=0^+) \tag{2}$$

$$n_{env}\sin(\theta)=n(t_1)\sin(\alpha)$$

$$k_x(y=\delta^-)=k_x(y=\delta^+) \tag{3}$$

$$k_x(y=\delta^-)=k_x(y=\delta^+)$$

$$n(t_2)\sin(\theta)=n(t_1)\sin(\varphi) \tag{4}$$

where − and + superscripts correspond to immediately above and below the y values where in the second lines of (2) and (3) we have used the relation of momentum and energy $k_0=n(t)\omega_0$ with the incident and exiting angles being θ and φ, respectively. We then rewrite this equation by scaling the refractive index at $t_1$ and $t_2$ in terms of their average $\bar{n}$ and difference δn i.e., $n(t_1)=\bar{n}+\delta n$ and $n(t_2)=\bar{n}-\delta n$. Notice that for δn>0 the refractive index change is from high-to-low and reversed for δn<0. The resulting equation is $$\varphi=a\sin\left(\frac{1-\delta n/\bar{n}}{1+\delta n/\bar{n}}\sin(\theta)\right) \tag{5}$$

Figure 4:
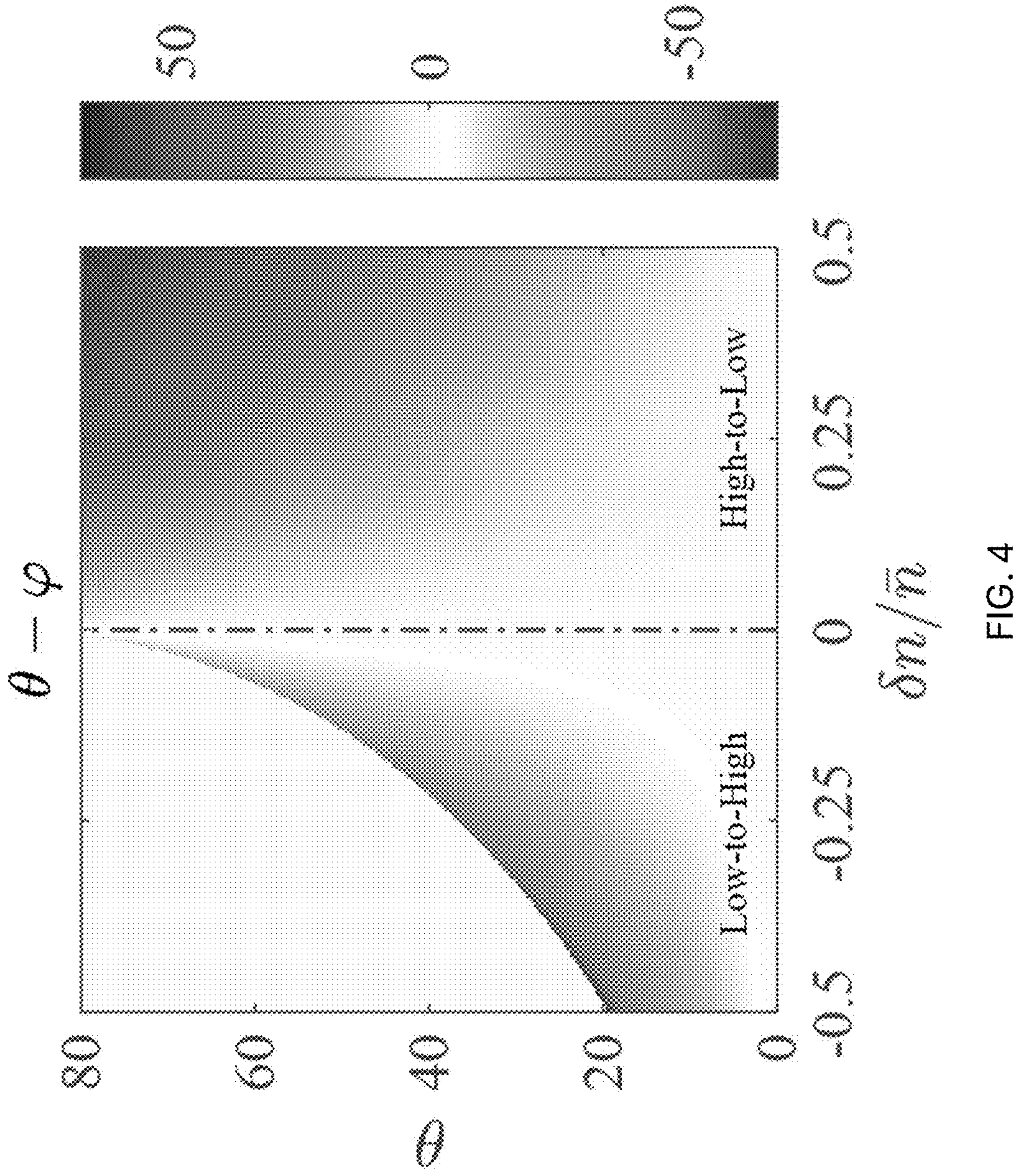
FIG. 4 is a graph of angular change between the incidence angle θ and the exiting angle φ of an optical ray transmitted through a time varying media, where the y-axis shows the dependence on incident angle and the x-axis shows the dependence on the relative refractive index change experienced by the ray during transit, and where the effect is maximized at along the critical angle between vacuum and the medium.

The result of Equation (5) subtracted from the incident angle and is plotted in FIG. 4 (a graph of incident angle θ vs. $\delta n/\bar{n}$) for different incident angles and values of $\delta n/\bar{n}$. For large enough transitions in the low-to-high regime a critical angle condition occurs regardless of the absolute value of $\bar{n}$ and at the second interface. This critical angle only occurs for the time-varying case and we will refer to it as the time-varying critical angle. Along the time-varying critical angle curve, the exiting angle has the largest sensitivity to changes in refractive index or changes of incident angle: a fact exploited below for angular streaking.

Along the time-varying critical angle, the gradient of angular difference is evident from the quick change from green to white. To illustrate this, consider different temporal slices of a pulse incident on a time-varying slab. Each temporal slice will experience a different amount of refractive index change leading to different exiting angles. The difference between exiting angles of subsequent temporal slices will be largest near the time-varying critical angle. Importantly, the ultrafast rise times experimentally demonstrated coupled with the large angular difference implies an ultrafast angular streaking potential. There is also a significant angular change at higher incident angles and large positive changes in refractive index, but this region of experimental parameters space is less appealing because of the near-glancing angles of incidence and the significantly reduced gradient along the refractive index direction.

The simple model presented in Equation (5) can be improved upon by including equation (1). Consider a pulsed wave incident on the slab with the form $$E_{in}(x,t)=A(x,t)e^{-i\omega_0 t+ik_0\sin(\theta)x} \tag{6}$$

where A(x,t) is the amplitude function,
$\omega_0$ is the carrier frequency related,
$k_0$ is the wavevector, and
x is the position along the slab-environment interface. Therefore, the exiting field is related to the incident field by the equation $$E_{out}(t',x')=E_{in}(t+T(t),x+L(t)) \tag{7}$$

In equation (7), the primed coordinates indicate coordinates at the exit plane of the time-varying media. To calculate the outgoing angle, we assume a functional form of the refractive index and use Snell's law, and equations (1), (6), (7) to calculate L(t) and T(t). These are then inverted to be functions of t' resulting in an expression for the outgoing field $$E_{out}(t',x')=A(t',x')e^{-i\omega_0 t'+ik_0\sin(\theta)x'+i\Phi(t')} \tag{8}$$

where Φ(t') is the time dependent phase incurred by traversing the slab. Finally, we can determine the time-dependent exiting angle φ by determining the direction of constant phase fronts. This results in $$\phi(t')=\tan^{-1}\left[\sqrt{\left(\frac{n_{env}\omega(t')}{ck_0\sin(\theta)}\right)^2-1}\right] \tag{9}$$

where $\omega(t')=\omega_0-d\Phi/dt'$ is the instantaneous frequency. This equation arises from the fact that transverse momentum $k_x$ is conserved and therefore the angular change is directly related to the instantaneous frequency shift. In the following section, we will employ this expression to explore the capability of temporal streaking.

We consider a pulsed plane wave witness beam with pulse duration pulse incident on a time-varying slab with thickness δ that changes from $n_1$ to $n_2$ as a sigmoid function with rise time $\tau_{rise}$ as shown in FIG. 1*b*. The sigmoid is driven by the trigger beam where $\tau_{rise}$ is directly proportional to the pulse duration of the trigger beam. The relative delay between the center of the witness pulse and the refractive index change is $t_{delay}$. The streaking performance of this scheme is determined by the derivative of $\varphi$ with respect to time averaged over the amplitude of the pulse. We perform multiple parameter sweeps to understand the effect of delay, rise time and sample thickness on the streaking performance. In all scans the initial parameters are $\tau_{pulse}$ is about 11 fs, $\tau_{rise}$ is about 10 fs, $t_{delay}=-\tau_{pulse}$, $n_1=0.66$, $n_2=1.41$, and $\delta=5$ μm unless otherwise stated. From Equation (5) and FIG. 4, we set the optimal angle of incidence just below the time-varying critical angle $\theta=40°$.

Referring to FIGS. 5*a*-5*d*, output results are provided for numerical calculations of streaking performance. The streaking performance is characterized by the derivative of the exiting angle averaged over the probing pulse amplitude. In particular, referring to FIG. 5*a*, which is a graph of change of exit angle ($\langle d\varphi/dt \rangle$) vs. relative delay between probe pulse and refractive index change, we scan the relative delay between the index change from the trigger beam and the witness pulse. Two optimal delays are observed for the streaking centered nearly at $\pm\tau_{pulse}$. They are slightly shifted to later times due to the thickness of the sample and the pulse duration. Remarkably we see that at the maximum, the streaking is about 5 mrad/fs. To put that into context, the same angle is subtended by a 5 μm pixel—standard for many CCD and CMOS cameras—placed at 1 mm distance from the sample. Simply by increasing the camera distance by a factor of 10, the streaking performance reaches the attosecond regime.

Figure 5A:
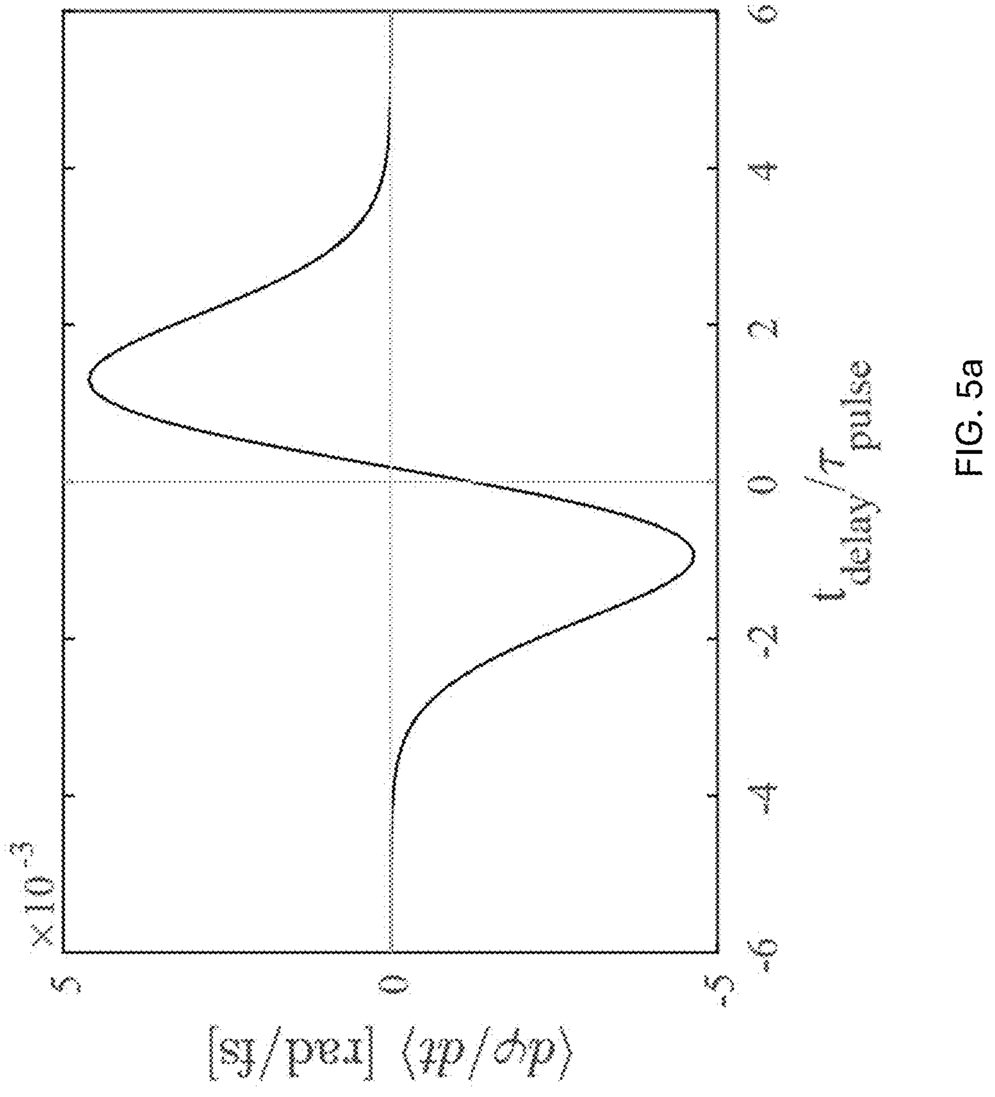
FIG. 5*a* is a graph of the average change of exit angle (dφ/dt) vs. relative delay between probe pulse and refractive index change.
Figure 5B:
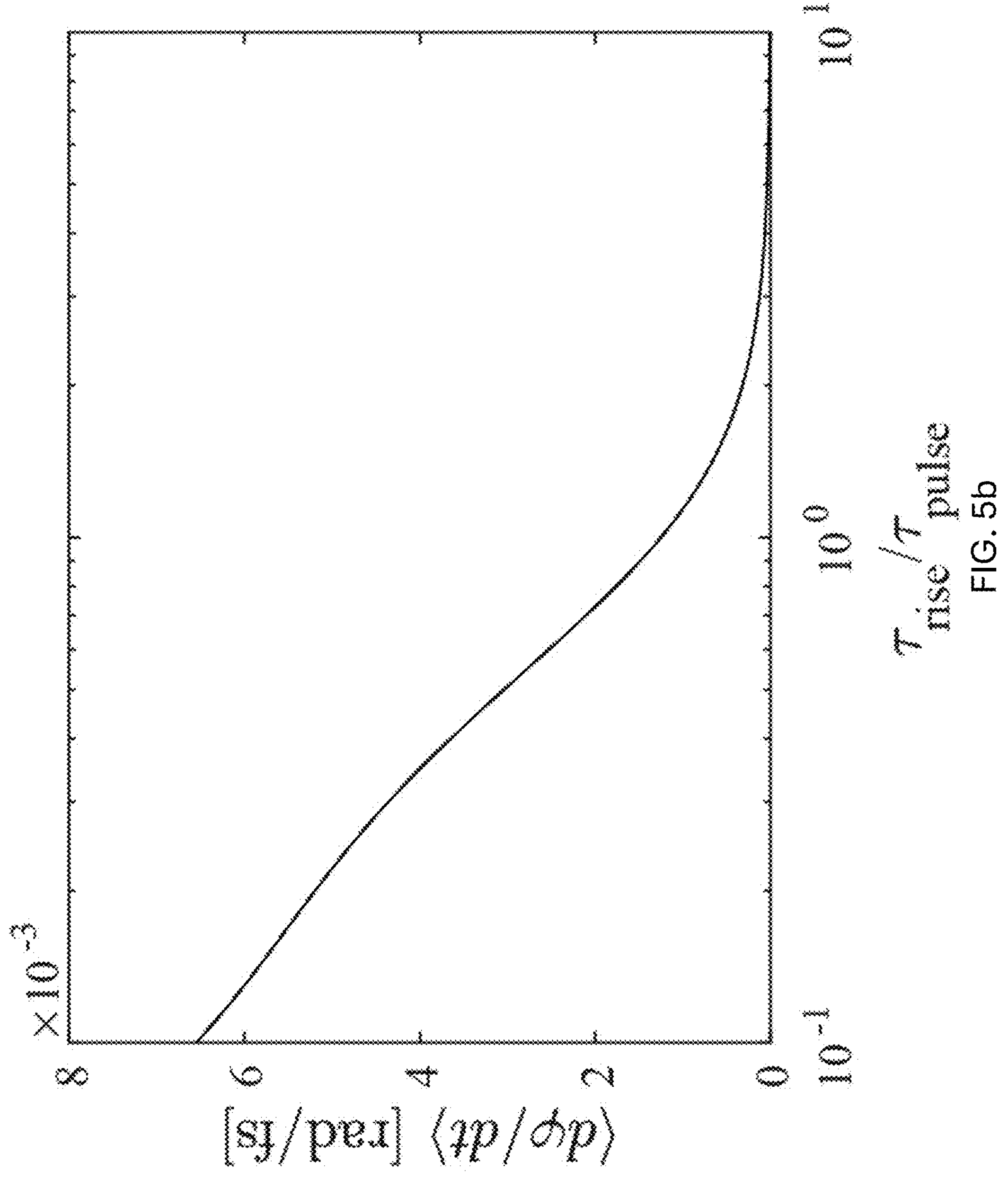
FIG. 5*b* is a graph of the average change of exit angle (dφ/dt) vs. the rise time of the refractive index change $\tau_{rise}$.
Figure 5C:
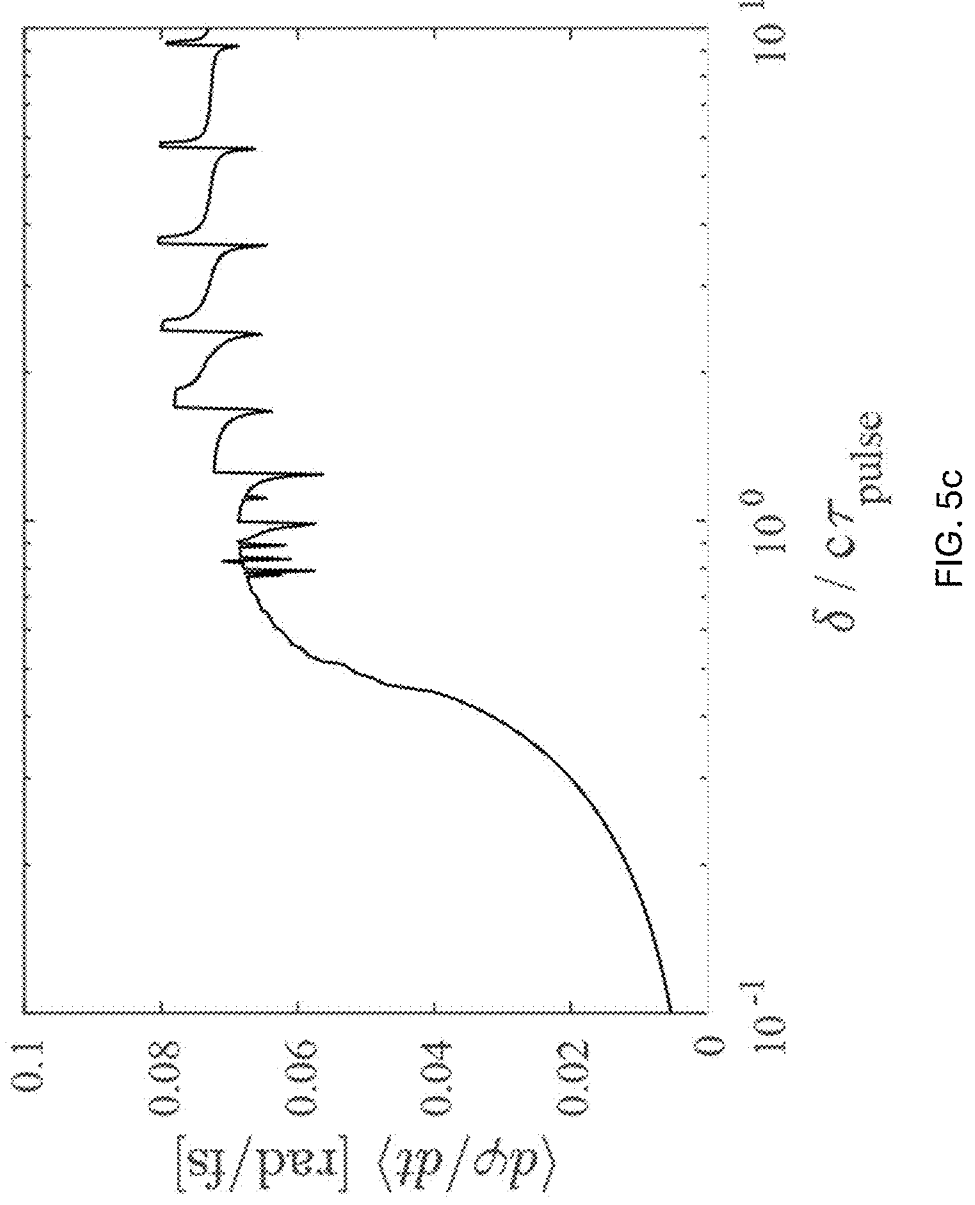
FIG. 5*c* is a graph of the average change of exit angle (dφ/dt) vs. the thickness δ of the ENZ slab.
Figure 5D:
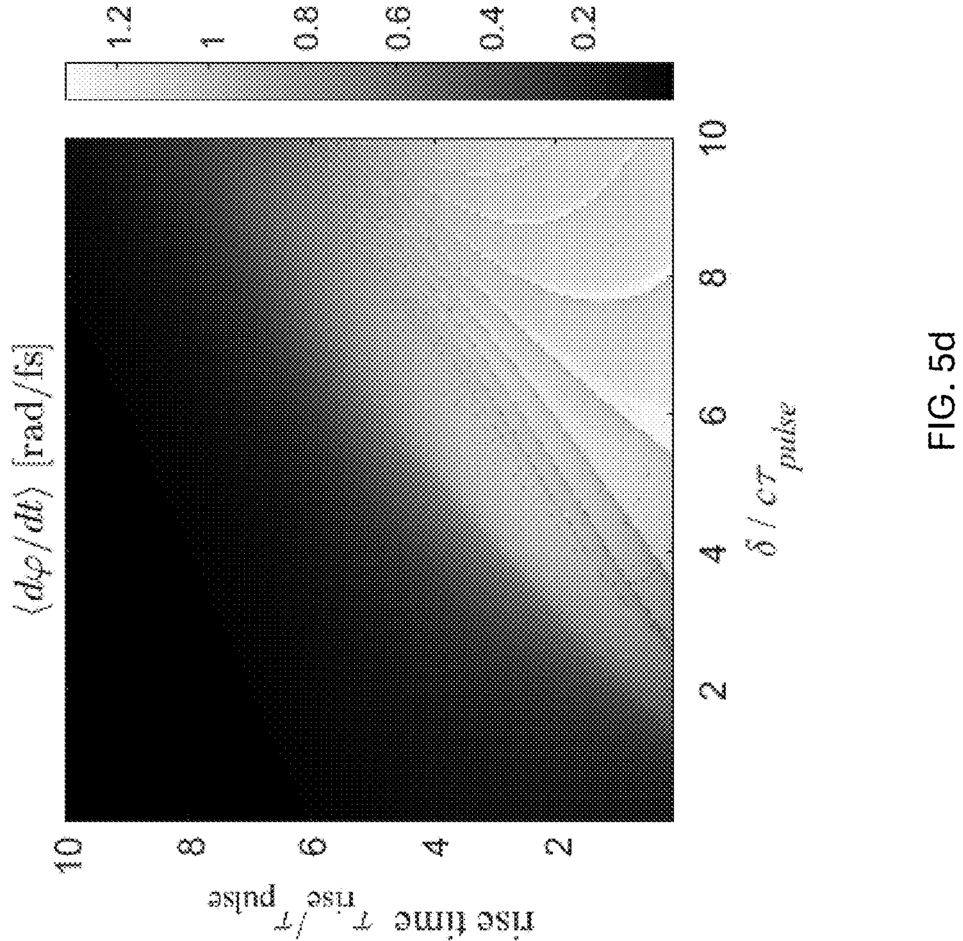
FIG. 5*d* is a graph of the average change of exit angle (dφ/dt) for both ENZ thickness δ and rise time $\tau_{rise}$.

Next, we examine the role of rise time on the effect of optical streaking. We set the delay to $t_{delay}=-\tau_{pulse}$ for this scan. Referring to FIG. 5*b*, the rise time is varied from 0.1 to 10 times the witness pulse duration. An almost threshold-like behavior of the streaking performance is observed at $\tau_{rise}=\tau_{pulse}$. Referring to FIG. 5*c*, the optical streaking performance is plotted against the sample thickness $\delta$. A similar threshold effect is visible near $\delta/c=\tau_{pulse}$, where c is the speed of light in vacuum. Increasing the sample thickness introduces resonant-like peaks in the streaking performance. As discussed above, the competition of path-length shortening in L(t) and longer transit times of T(t) can be thought of in this case as a temporal Fabry-Pérot resonance, known to a person having ordinary skill in the art. These resonances only appear for thick samples where large phases can be accumulated. Referring to FIG. 5*d*, the trade-off for optical streaking performance between rise time and delay is plotted showing the evolution of the threshold effect and the temporal Fabry-Pérot resonances.

Figure 6A:
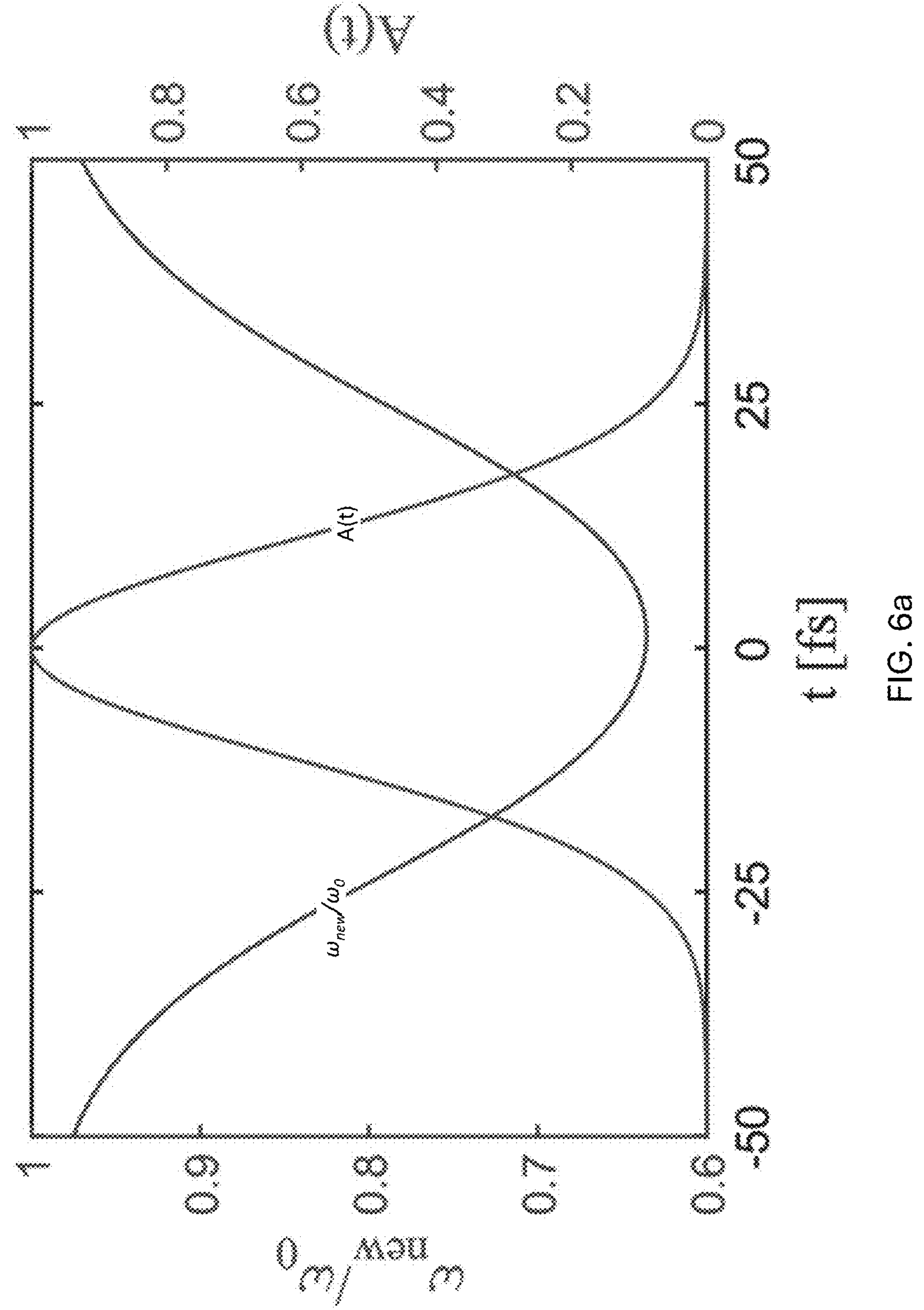
FIG. 6*a* is a graph of the exiting frequency of a ray passing through the time-varying media as a function of time (identified as $\omega_{new}/\omega_0$) calculated from theory, where the curve identified as A(t) shows the amplitude A of the light pulse, where these combine to depict the amount of energy at a given frequency in given instance.
Figure 6B:
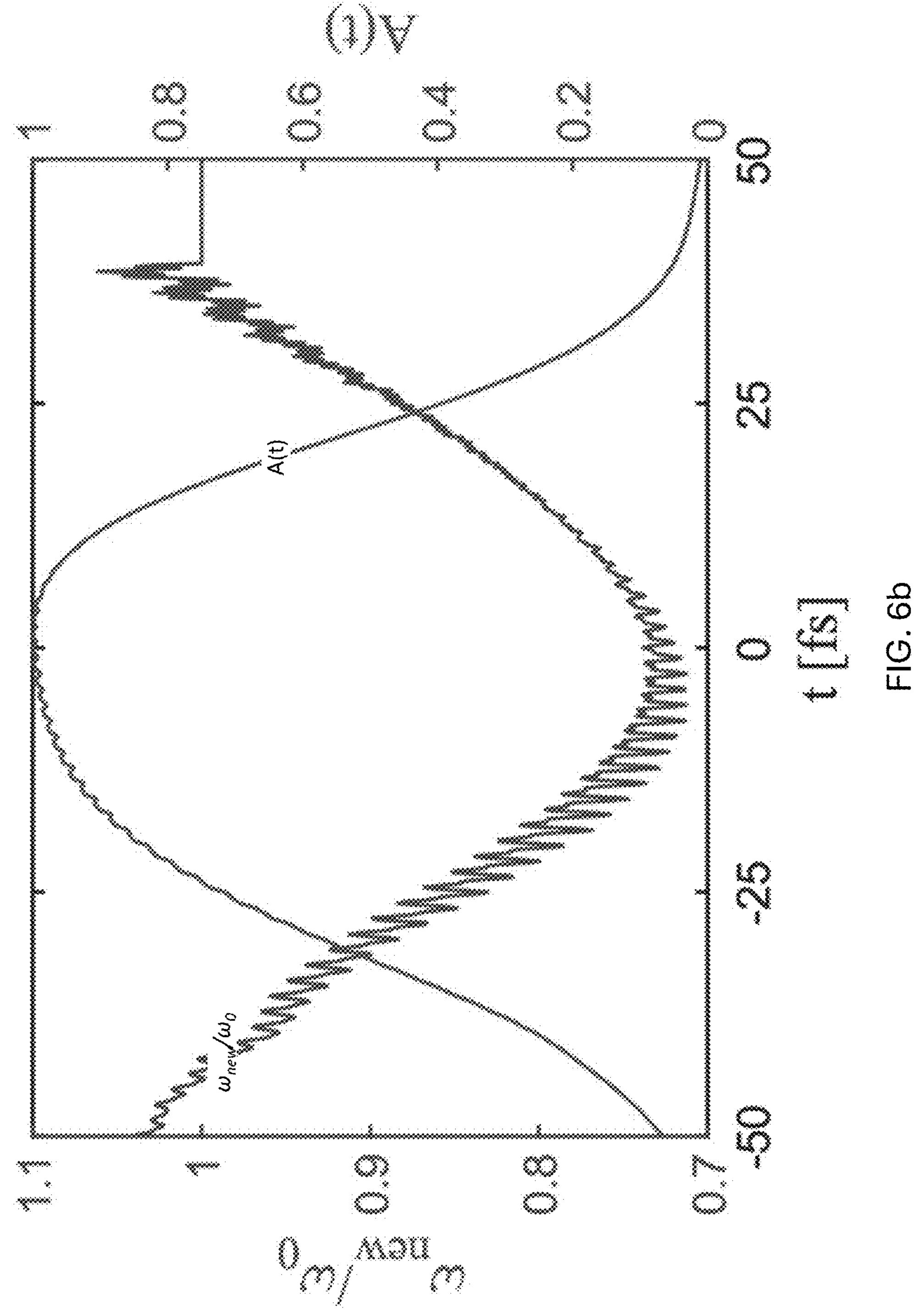
FIG. 6*b* is a graph of the exiting frequency of a ray passing through the time-varying ENZ slab as a function of time (identified as $\omega_{new}/\omega_0$) calculated from FDTD simulation, where the curve identified as A(t) shows the amplitude A of the light pulse. The simulation are performed with the same parameters as FIG. 6*a.*
Figure 6C:
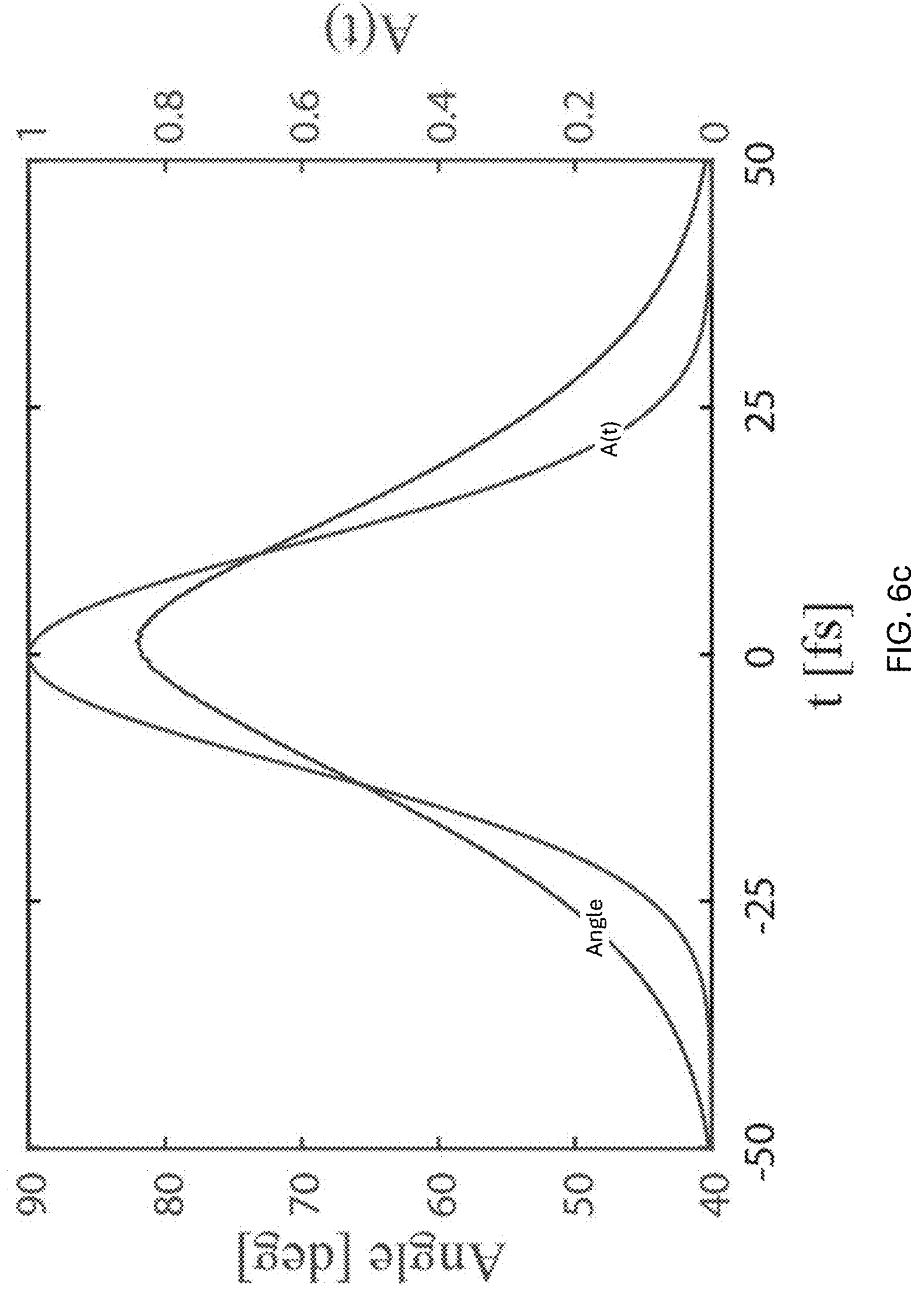
FIG. 6*c* is a graph of the angle of a ray passing through the time varying ENZ slab as a function of time (identified as Angle) calculated from theory, and where the curve identified as A(t) shows the amplitude A of the light pulse. These combine to depict the amount of energy directed to a given angle in given instance.
Figure 6D:
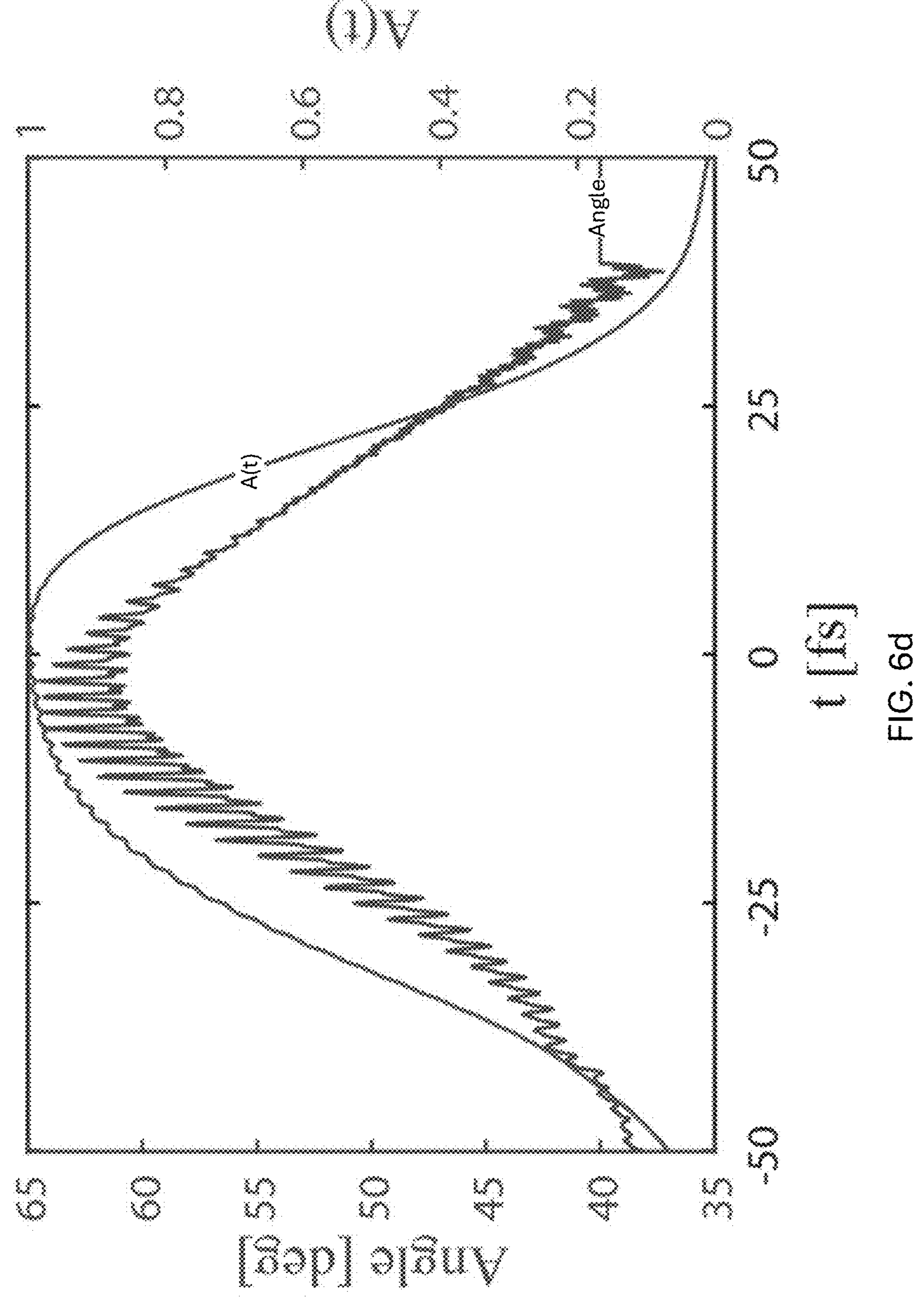
FIG. 6*d* is a graph of the angle of a ray passing through the time varying ENZ slab as a function of time (identified as Angle) calculated from FDTD simulations, and where the curve identified as A(t) shows the amplitude A of the light pulse. The simulation are performed with the same parameters as FIG. 6*a.*

The above model was compared to standard Finite Difference Time Domain (FDTD) simulations. In the simulation, an 11 fs loosely focusing Gaussian laser pulse was incident on a slab at $\theta=40°$. The refractive index was modulated from $n_1=0.66$ to $n_2=1.41$ over 10 fs and the delay was set to $t_{delay}=-\tau_{pulse}$. After passing through the slab, the electric field was recorded as a function of time and transverse position as described in Equation (8). The results of theoretical calculations and numerical simulations are shown in FIGS. 6*a*, 6*b*, 6*c*, and 6*d*. In FIG. 6*a* the theoretical and in FIG. 6*b*, the frequency shift due to the time-varying refractive index is calculated theoretically and simulated against time as shown by curves identified as $\omega_{new}/\omega_0$. The pulse amplitude A(t) is shown in the curve identified as A(t) for reference. By this, one can understand the number of photons at a given frequency and a given time. Referring to FIGS. 6*c* and 6*d*, the optical streaking performance for both theory and simulation are shown in the curves identified as Angle. Again the curves identified as A(t) are the amplitudes which thereby allow the reader to understand the number of photons directed to a given angle in a given instant. The calculations and simulations are in excellent agreement. Most importantly, the ultrafast angular change across the pulse spans 20 degrees demonstrating capacity for attosecond angular streaking.

Those having ordinary skill in the art will recognize that numerous modifications can be made to the specific implementations described above. The implementations should not be limited to the particular limitations described. Other implementations may be possible including but not limited to additional optical imaging systems before and/or after the ENZ slab. Additionally, the use of a dimension that is orthogonal to streaking (e.g., coming out of the page in FIG. 2) could serve auxiliary purposes such as spectroscopy (e.g., measuring a spectrum along that dimension). Finally, a general algorithm for feedback and optimization of the streaking camera performance can be implemented by varying parameters such as ENZ material, ENZ thickness, incidence angle of both the witness and trigger pulse, delay between witness and trigger pulse, trigger pulse intensity, and distance between ENZ slab and detector.

The invention claimed is:

1. A method of making a photonic time-varying medium, comprising:

depositing an epsilon-near-zero (ENZ) target material in a deposition chamber having a pressure, thereby causing ablation followed by accumulation in form of a film directly or indirectly onto a substrate until a predetermined thickness of the ENZ target material accumulates on the substrate, wherein the thickness ranges from about 10 nanometer to about 50 μm, wherein the pressure of the deposition chambers is between about $1\times10^{-12}$ to about $1\times10^{-2}$ torr, and wherein the ablation occurs at a temperature of between about −20° C. and about 900° C. within the deposition chamber.

2. The method of claim 1, wherein the ENZ target material is one of zinc oxide (ZnO), Indium Oxide (InO), Tin Oxide (SnO), Indium Tin Oxide (ITO), or Gallium Oxide (GaO).

3. The method of claim 1, wherein the ENZ target material is doped ZnO, doped InO, doped SnO, doped ITO, or doped GaO with a dopant material.

4. The method of claim 3, wherein the dopant material is one of gallium, aluminum, indium, or a combination thereof.

5. The method of claim 4, wherein the dopant material has a concentration of between about 0% and about 15%.

6. The method of claim 1, wherein the step of depositing the ENZ target material is based on application of a pulsed laser.

7. The method of claim 1, wherein the step of depositing the ENZ target material is based on Atomic Layer Deposition.

8. The method of claim 1, wherein the step of depositing the ENZ target material is based on sputtering and evaporation.

9. The method of claim 1, wherein the ENZ target material is deposited on an adhesion layer which is disposed atop the substrate, and wherein the adhesion layer is one of platinum, titanium, palladium, or a combination thereof.

10. The method of claim 1, wherein the substrate is made of one of fused silica, sapphire, silicon, or a combination thereof.

11. A streak camera, comprising:
an entrance slit forming a first end of the streak camera, the entrance slit having a width and height;
an image capture device forming a second send of the streak camera; and
an epsilon-near-zero (ENZ) slab defined by a bandgap energy and plasma frequency disposed within the streak camera, the ENZ slab configured to receive two beams with a predetermined delay therebetween, the two beams include i) a witness beam through the entrance slit at an incident angle θ, and ii) a trigger beam at substantially a normal incident angle, wherein the trigger beam applies energy at a level below the bandgap energy of the ENZ slab to thereby modify refractive index of the ENZ slab, and thus modify the witness beam resulting in a time-varying exit angle φ(t) onto the image capture device.

12. The streak camera of claim 11, wherein the ENZ slab is made of an ENZ film having a thickness of between about 10 nm to about 50 μm disposed directly or indirectly onto a substrate.

13. The streak camera of claim 12, wherein the ENZ film material is one of zinc oxide (ZnO), Indium Oxide (InO), Tin Oxide (SnO), Indium Tin Oxide (ITO), or Gallium Oxide (GaO).

14. The streak camera of claim 12, wherein the ENZ film material is doped ZnO, doped InO, doped SnO, doped ITO, or doped GaO with a dopant material.

15. The streak camera of claim 14, wherein the dopant material is one of gallium, aluminum, indium, or a combination thereof.

16. The streak camera of claim 15, wherein the dopant material has a concentration of between about 0% and about 15%.

17. The streak camera of claim 12, wherein the substrate is made of one of fused silica, sapphire, or a combination thereof.

18. The method of claim 12, wherein the ENZ film material is deposited on an adhesion layer which is disposed atop the substrate, and wherein the adhesion layer is one of platinum, titanium, palladium, or a combination thereof.

19. The streak camera of claim 12, wherein trigger beam pulse width is a multiple of the witness beam pulse width, and the multiple is between about 0.1 and about 10.

20. The streak camera of claim 12, wherein the bandgap is between about 0.7 eV and about 3 eV.

21. The streak camera of claim 12, wherein witness the incident angle θ is between about 20 and about 80 degrees.

22. The streak camera of claim 12, wherein predetermined delay between the rise of the trigger beam to rise of the witness beam is a multiple of the witness beam pulse width, and the multiple is between −3, and about 3.

23. The streak camera of claim 12, wherein the width of the slit is between about 0.1 μm and about 20 μm.

24. The streak camera of claim 12, wherein the image capture device includes a complementary metal oxide semiconductor sensor.

25. The streak camera of claim 12, wherein the image capture device includes a charged coupled device.

* * * * *